US008640604B2

(12) United States Patent
Doglioni Majer

(10) Patent No.: US 8,640,604 B2
(45) Date of Patent: Feb. 4, 2014

(54) DISPOSABLE CAPSULE FOR DRINKS

(75) Inventor: Luca Doglioni Majer, Carate Urio (IT)

(73) Assignee: Tuttoespresso, S.p.A., Caronno Pertusella (IT)

( * ) Notice: Subject to any disclaimer, the term of this patent is extended or adjusted under 35 U.S.C. 154(b) by 1178 days.

(21) Appl. No.: 11/673,465

(22) Filed: Feb. 9, 2007

(65) Prior Publication Data
US 2011/0030563 A9 Feb. 10, 2011

Related U.S. Application Data

(63) Continuation of application No. PCT/IT2004/000503, filed on Sep. 17, 2004.

(51) Int. Cl.
A47J 31/06 (2006.01)
A47J 31/057 (2006.01)
B67D 5/00 (2006.01)

(52) U.S. Cl.
USPC .................................. 99/300; 99/295; 426/77

(58) Field of Classification Search
USPC ............ 99/295, 323, 302 R, 300; 426/77, 79, 426/80, 112, 115
See application file for complete search history.

(56) References Cited

U.S. PATENT DOCUMENTS

| 5,398,595 | A | * | 3/1995 | Fond et al. | 99/295 |
| 5,472,719 | A | * | 12/1995 | Favre | 426/77 |
| 5,608,643 | A | | 3/1997 | Wichter et al. | |
| 5,656,311 | A | | 8/1997 | Fond | |
| 6,636,151 | B2 | | 10/2003 | Busick | |
| 6,777,007 | B2 | | 8/2004 | Cai | |
| 7,032,818 | B2 | | 4/2006 | Thomas et al. | |
| 2003/0070554 | A1 | * | 4/2003 | Cortese | 99/279 |
| 2003/0172813 | A1 | | 9/2003 | Schifferle | |
| 2005/0150390 | A1 | | 7/2005 | Schifferle | |
| 2006/0174769 | A1 | * | 8/2006 | Favre et al. | 99/275 |
| 2006/0219098 | A1 | * | 10/2006 | Mandralis et al. | 99/279 |
| 2010/0077928 | A1 | | 4/2010 | Schmed et al. | |

FOREIGN PATENT DOCUMENTS

| CH | 688686 | * | 10/1991 | | B65D 81/34 |
| CH | 688686 A5 | * | 1/1998 | | B65D 81/34 |
| EP | 0 521 510 A1 | | 1/1993 | | |
| EP | 1 247 756 A1 | | 10/2002 | | |
| EP | 1 344 722 A1 | | 9/2003 | | |
| EP | 1 364 605 A1 | | 11/2003 | | |
| EP | 1 500 358 A1 | | 1/2005 | | |
| EP | 1 555 219 A1 | | 7/2005 | | |
| EP | 1 580 144 A1 | | 9/2005 | | |
| FR | 2.211.924 | | 7/1974 | | |
| WO | WO 92/07775 | | 5/1992 | | |
| WO | WO 95/25457 | | 9/1995 | | |
| WO | WO 01/43088 | | 6/2001 | | |
| WO | WO 02/081337 A1 | | 10/2002 | | |
| WO | WO 03/071496 | | 6/2003 | | |
| WO | WO 03/059778 A2 | | 7/2003 | | |
| WO | WO 2004/030500 A1 | | 4/2004 | | |
| WO | WO 2004/087529 A1 | | 10/2004 | | |
| WO | WO 2005080223 A1 | * | 9/2005 | | B65D 81/00 |

* cited by examiner

Primary Examiner — Jianying Atkisson
(74) Attorney, Agent, or Firm — Oblon, Spivak, McClelland, Maier & Neustadt, L.L.P.

(57) ABSTRACT

A capsule (1) for the preparation of beverages within dispensing machines, has a sealing film (4) which is perforated at the time of the use when the pressurized infusion water is supplied to the capsule and deforms the film (4), bringing it into contact with underlying perforation means (6) fixed to the same capsule.

19 Claims, 8 Drawing Sheets

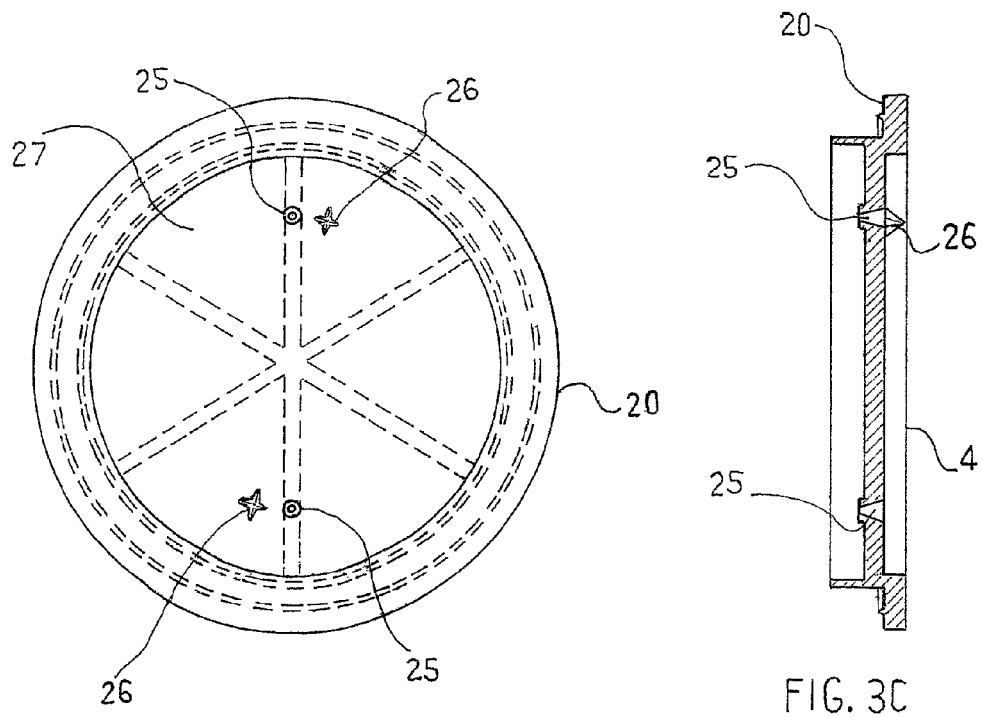

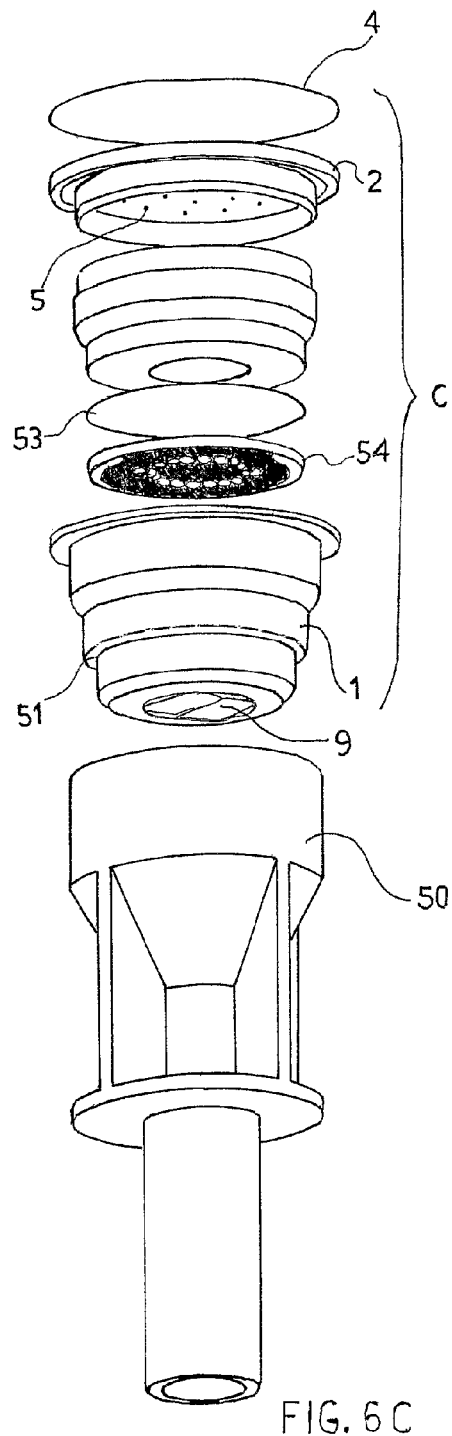
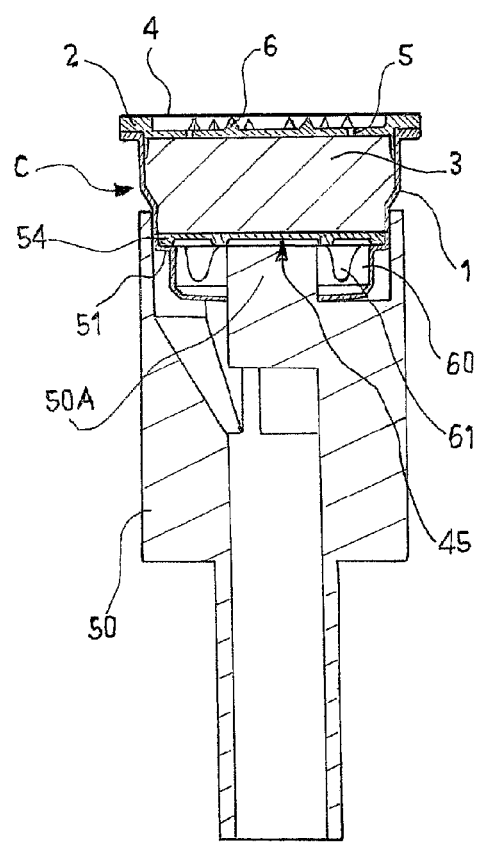
FIG. 6C
FIG. 6D

DISPOSABLE CAPSULE FOR DRINKS

This application claims priority as a continuation of PCT/IT2004/000503 filed Sep. 17, 2004.

BACKGROUND OF THE INVENTION

The present invention concerns a disposable capsule containing for example powder or ground products intended for the preparation of beverages such as coffee, tea or the like in dispensing machines. The invention also concerns a method for opening said capsule.

For the sake of clarity, in the following description reference will be explicitly made to the specific manufacturing of containers shaped as disposable capsules for the preparation of beverages, being understood that the principles of the present invention may be applied to any type of sealed containers for foodstuff which has to be opened in order to release its contents, or to allow the mixing with other products or substances, before or during the evacuation of the contents from the same container.

DESCRIPTION OF THE KNOWN ART

For instance, the European patent application EP 1440910 concerns a disposable capsule for the preparation of beverages starting from a food product containing liquid or powder milk, or containing roasted or ground coffee, tea, etc.

Currently, the disposable capsules available for the preparation of beverages are obtained from plastic materials, such as polyolefins (e.g. polypropylene and polyethylene and/or copolymers thereof) or laminated films of polyolefins and aluminium suitable for use in the food field. U.S. Pat. No. 4,646,626 (Tuttoespresso) discloses capsules from a plastic material provided with one or more holes, obtained on the lid, to allow the inflow of pressurized water during their use. The beverage exits the capsule through an opening in the bottom and an underlying collector. Because of the holes, in order to avoid the oxidation and the deterioration of the organoleptic characteristics of the product, capsules are distributed in sealed packages, as for example the so called "blisters".

Thus, the capsule is hermetically packaged between a preformed tray from a plastic material and a foil made from plastic or aluminium. The latter must be removed to allow its use in the dispensing machine.

This solution is not suitable for the use with automatic beverage dispensing machines. In fact, once the capsules are removed from their hermetic package and loaded in the automatic machine, they are no longer sealed and the product (for instance ground coffee) might deteriorate as above described.

Also, disposable capsules are known intended to be perforated at the time of their use. However, perforation of the capsule when it is used is operated by one or more lances, or piercing elements, which penetrate the capsule from the outside to the inside. Breaking of the container walls, or their perforation, may cause the release of particles of the same capsule that fall inside the container, mixing with the food product. As a consequence, the dispensed beverage may also be disagreeable and have a poorly appetizing aspect, or worst, may contain extraneous parts.

For example, U.S. Pat. No. 5,656,316 (Nestec) concerns a disposable capsule for beverages whose upper wall can be perforated by a conduct for feeding of pressurized water inside the capsule. A collector of the beverage is located under the capsule bottom wall, which breaks upon deformation under an increase in the internal pressure of the capsule, thus allowing for the obtained beverage to exit. In this embodiment means for the capsule opening are provided on the beverage dispensing machine, having the disadvantage of contacting the beverage, with resulting cross-contamination problems when capsules for different beverages are utilized.

A further example of a system for opening the capsule through mobile lances or piercing elements is the one related to the capsule described in the international patent application WO 2004/026091 (Kraft).

Patent application WO 02/081337 (Tuttoespresso) concerns a capsule sealed at its upper part by a perforable wall. Perforation of the wall is operated by a piston movable inside the capsule. As shown in FIGS. 4 and 5 of application WO 02/081337, the movable piston is pushed toward the upper wall of the capsule by the external piercing element which penetrates through the bottom of the capsule. The drawback of such embodiment is that it requires the presence of a movable element, with resulting production and assembling costs.

Therefore, there is the need for a sealed capsule to be provided, containing product for the preparation of beverages, which is cheap and easy to manufacture, which can be used with both automatic dispensing machines, and with hand-loaded machines, which does not require changes in the structure of the same machines and which allows known capsules, e.g those packed in blisters, to be used.

SUMMARY OF THE INVENTION

Thus, it is an object of the present invention to provide a disposable sealed capsule for beverages and foodstuff which overcomes, in a simply and effective way, the drawbacks of the known technique, being at the same time cheap to manufacture and simple to use.

Within this scope, an object of the present invention is to provide a capsule which allows for its opening exclusively when it is used, the beverage or foodstuff dispensing and the capsule opening being carried out at the same time.

A further object of the present invention is to provide a disposable capsule which is suitable to be sealed in a controlled atmosphere, or vacuum-packed, without using further capsule packages for preserving the organoleptic properties of the beverage.

It is a further object of the present invention to provide a method and a disposable capsule which permit to prevent, or however to limit as much as possible, the eventual release of capsule particles during its opening.

These and other objects are achieved by the present invention which concerns a disposable capsule according to claim 1.

The invention also concerns a method for opening the aforesaid capsule, characterized according to claim 13.

As described in detail in the following description, the means for perforating the capsule operate the perforation of the film when this deforms under the force of an external pressure, for example the pressure exerted by the pressurized hot water directed toward the capsule, and its film, for the beverage preparation.

According to a preferred embodiment of the present invention, the means for perforating the film are provided on the capsule wall, preferably the upper wall, which is located adjacent and underlying the film which seals the capsule.

Preferably the means for the perforation of the film are fixed and bonded with respect to the capsule and, for instance, comprise one or more cutting projections. The cutting projections may be integral with a surface of the capsule and may have different shapes. For example they may be sharp cusps or wedges, and also they may have a generally pyramidal shape.

According to a preferred embodiment of the invention, the film is externally provided and covers the whole upper wall of the capsule, so to hermetically seal it, and the cutting projections are cusps located on the upper surface of the same wall, directed toward the film. The cusps are preferably located in correspondence of through holes provided in the upper wall of the capsule to supply pressurized water inside the capsule, where the food product, e.g coffee powder, is housed.

The capsule according to the invention has numerous advantages over prior art. In fact, the film which seals the capsule of the invention is perforable at the time of the actual use of the capsule by perforation means which are fixed to the capsule. Thus, differently from what provided for the known capsules, the film has not to be manually separated from the capsule before its use and has not to be perforated by means provided on the machines loaded with the capsule (as in the capsule according to U.S. Pat. No. 5,656,316). The capsule according to the invention is thus simple to pack and to use, and also guarantees high quality standards for the contained foodstuff which keeps unaltered for a long time, in an optimal conservation state, the organoleptic characteristics.

With respect to the embodiment according to application WO 02/081337 the capsule according to the present invention has a simplified structure, because the surfaces for the perforation of the film are fixed, and permits to perfectly isolate the food product from the external environment, while resulting inexpensive.

It will be clear to the skilled person that the capsule of the invention is particularly suitable for the use with machines for the preparation of coffee or beverages. In fact the film of the capsule can be moved toward the cutting projections by the pressurized water supplied by such machines for dispensing the beverages. Thus the film breaks only when the capsule is actually used, allowing the water to enter the capsule itself.

Traditional capsules have another drawback. The amount of product to be housed inside the capsule depends on the type of the beverage to supply. For example, capsules used for soluble beverages generally contain up to about 20 grams soluble powder, while the capsules used for dispensing coffee generally contain up to about 10 grams of powder coffee. Consequently, the volume of the capsule has to be adapted, during the design, to the different uses which the capsule is intended for. Typically, the capsules for the soluble beverages have greater dimensions than the corresponding dimensions of the capsules for coffee, for example the height of the capsule for soluble beverages may be greater than the height of the capsules for coffee. Thus also the machines provided for dispensing the beverages have to be designed in such a way to be compatible with the different available capsules.

Therefore the need is felt to provide capsules having sizes standardized as much as possible. It is required to provide capsules, having a given size, which can be utilized for the soluble beverages and for the coffee indifferently, or more generally, to provide capsules which can be utilized indifferently for dispensing beverages also in the case that the amount of the dose to be encapsulated differs between the various cases.

Another object of the present invention is to provide a capsule for the preparation of different beverages (or other similar foodstuff), compatible with automatic or hand-loaded dispensing machines, which allows for the encapsulation of different product doses in its inside, each dose with the suitable compactness grade depending on the kind of beverage to be dispensed, with no need for changing the external dimensions of the capsule.

This object is achieved by way of the disposable capsule according to the present invention for the preparation of a beverage from a food product housed therein, which capsule comprises a plurality of walls and means for dispensing the beverage, characterized in that it comprises at least an element for the partition of the internal volume of the capsule in two or more volumes for housing at least said food product, said partition element being fixed with respect to the capsule.

The volumes of the capsule may contain one or more food products, each in its optimal configuration, for example coffee powder with the right grounding grade and with the suitable compression.

According to an aspect of the present invention, the partition element can be housed internally to the capsule, for example secured or snap-engaged, preferably in correspondence of its lower portion.

According to an embodiment of the invention, the partition element is a disc or a substantially cylindrical spacer intended to support the food product between its upper wall and the upper wall of the capsule. In other words, the disc—or the spacer—works as a double bottom for the capsule. In this case the upper wall of the spacer is in fluid communication with the lower wall of the capsule (for example it is bored), in order to have the beverage prepared with the food product housed in the upper volume of the capsule to flow into the lower volume and then trough the opening for dispensing the beverage.

According to an embodiment, when the food product is for example ground coffee, the upper wall of the spacer is provided with a filter in order to block the solid portion of the beverage during its distribution.

The partition element may be snap-coupled to the lower portion of the capsule or it can be welded to the same. It is important that it reduces and/or divides the internal volume of the capsule without modifying the functioning thereof, thus permitting the normal beverage supply.

According to a further embodiment of the invention, the capsule provided with the partition element contains different products for a beverage into different volumes or chambers defined by the partition element inside the capsule. For example coffee may be housed in the upper chamber and powder (or liquid) milk into the lower chamber.

The capsule of the invention is particularly advantageous since it can be used indifferently for the preparation of soluble beverages or for the preparation of coffee from ground powder. In the first case, in fact, the capsule is not provided with the spacer and the internal volume of the capsule is the maximum. In the second case the spacer is inserted into the capsule before this is filled with the coffee powder, and the internal volume of the capsule is thus divided in a lower volume and in an upper volume, for example the upper volume is reduced of the amount necessary to house a lower dose of food product, maintaining at the same time the desired compactness grade. In this way it is possible to use the same capsule, having fixed outer size, i.e. without requiring two different capsules to be provided, having different sizes, each of which is for the preparation of a beverage of one type.

By changing the size of the spacer, and thus the partition of the capsule internal volume, it is possible to house an amount of food product with the compactness grade which meets the user's taste. In other words, the beverage prepared from the capsule may be more or less diluted also depending on how compacted is the encapsulated product.

The partition element according to the invention thus allows to adjust such compactness grade in order to dispense more or less diluted beverages, as for example required in different States.

For these reasons the partition element has predefined dimensions, i.e. it is calibrated to provide the partition of the capsule volume depending on the quality and the amount of the beverage requested by the user according resistant to the pressure exerted by the water and the food product during the preparation of the beverage, without being subject to deformations which might cause an undesired bypass of solid product to the outside of the same element and the filter, along the capsule walls. For this reason the partition element is preferably designed to have a structure optimized to support the different pressures which generate in the capsule depending on the different amounts and groundings of the contained product and on the different supplying pressure of the water. In fact different dispensing pressures are often provided in various Countries, as well as different product amounts, which product also has its predefined particle size. For example, the spacer may be designed to resist to pressures in the range from 1.5 bar to 20 bar, more frequently from 3 bar to 15 bar, so to allow a filter element (coupled to the same spacer or provided into it) to operate without being deformed.

BRIEF DESCRIPTION OF THE DRAWINGS

Further characteristics and advantages of the present invention will be more evident from the following description, given as a non limiting example with reference to the attached schematic drawings, wherein:

FIG. 3A is a top view of a detail of an alternative embodiment of the capsule according to the present invention;

FIGS. 3B and 3C are two section view of the detail of FIG. 3A;

FIG. 6C is an exploded view of another capsule according to the invention;

FIG. 6D is a cross section view of the capsule of FIG. 6C;

DESCRIPTION OF THE INVENTION EMBODIMENT

Figure 1:
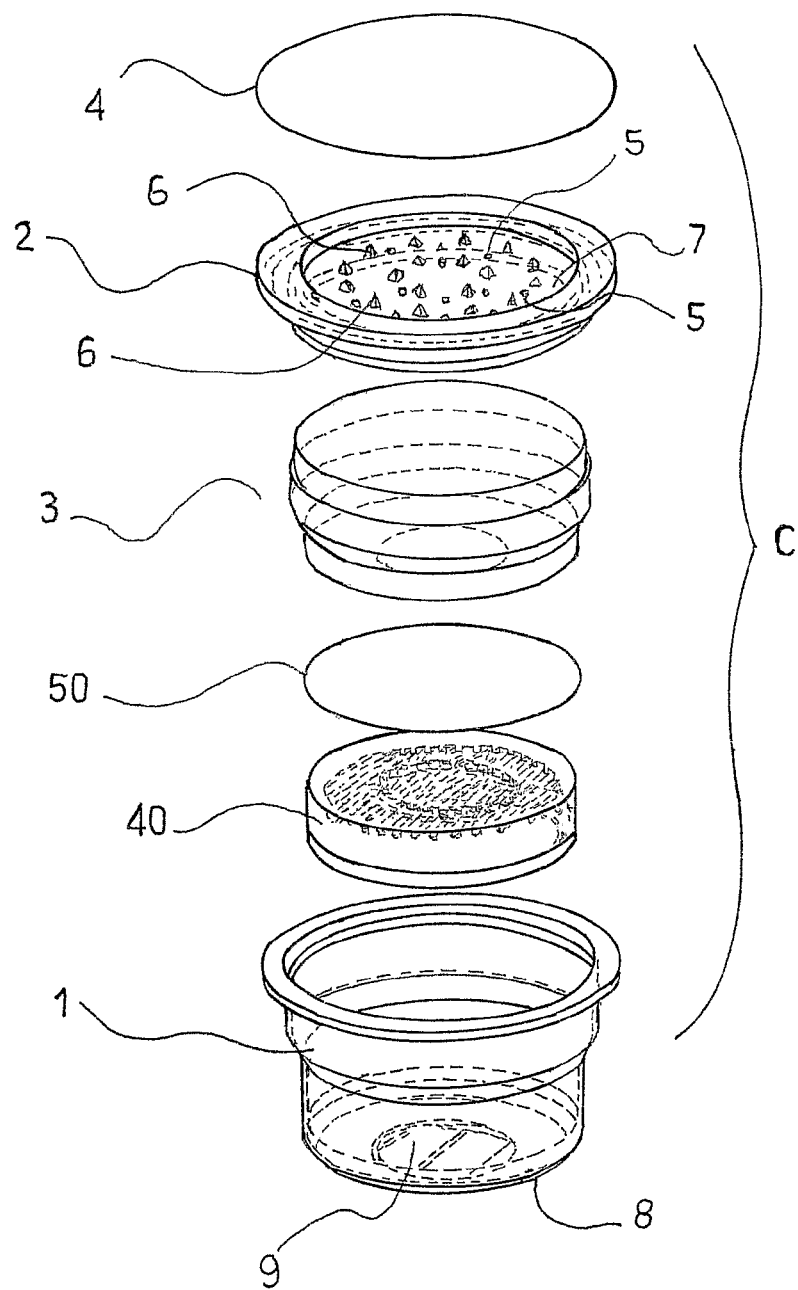
FIG. 1 is an exploded view of a capsule according to the present invention.
Figure 2B:
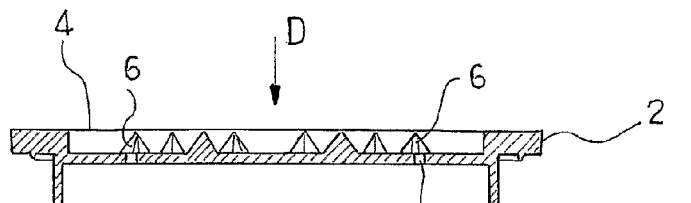
FIGS. 2B and 2C are two section views of the detail of FIG. 2A.
Figure 2A:
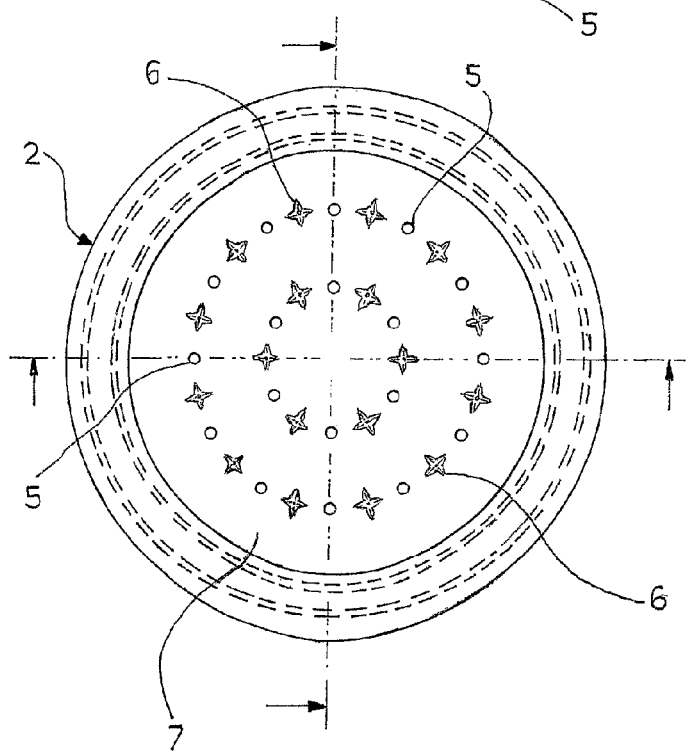
FIG. 2A is a top view of a detail of the capsule of FIG. 1.
Figure 2C:
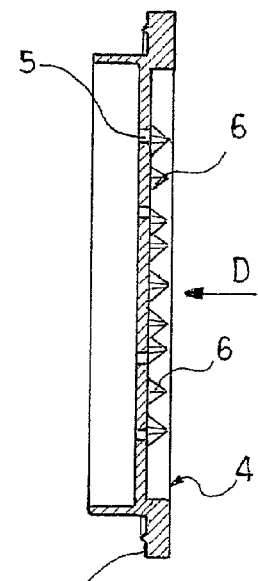

FIG. 1 shows a capsule C according to the invention, comprising a container 1, an upper wall 2 suitable to close the container 1 and a film 4. The upper wall 2 together with the film 4 hermetically close the assembled capsule C. For instance, the wall 2 may be welded to the container 1 through ultrasound welding. The film 4 is fixed, for example is thermo-welded, to the container 1 coupled to the wall 2, for example by thermo-welding the film 4 on a peripheral circular area of the wall 2. The capsule C may contain different food products 3. For example the capsule C of FIGS. 1 and 2-2C is suitable for the preparation of beverages from fresh ground products, e.g. coffee or the like, while the capsule shown in the FIGS. 3A-3C can be used for the preparation of beverages from soluble products.

In the embodiment shown in FIG. 1 the encapsulated product is coffee powder 3, compressed in the container 1 to a predefined compactness grade, known in the art. The film 4 is coupled to the upper wall 2, in order to seal it from the external atmosphere. In fact the upper wall 2 is provided with a plurality of holes 5 which set in fluid communication the upper surface of the same wall 2 with the internal volume of the container 1, and thus with the coffee powder. Thus holes 5 allow the pressurized water supplied by the pump to enter the assembled capsule upon it has passed through the film 4. Thus the task of the latter is to seal the capsule C until it is used, preventing the product 3 from being exposed to the air through the holes 5 of the wall 2, thus deteriorating or loosing its characteristics.

Advantageously, and contrary to the known capsules, capsule C is provided with its own means of perforating the film 4. As described in detail in the following, this feature allows to use capsule C with the traditional coffee dispensing machines (i.e. without having to customize the same), according to well known procedures, and to open it when the water is supplied to the capsule C for dispensing the beverage.

The means of perforating the film 4 preferably comprise a plurality of cutting surfaces or projections, fixed to a portion of the capsule C, which by contacting the same film 4 operate its partial breaking, for instance through perforation or tearing. The contact between the film 4 and the cutting surfaces is preferably provided upon a deformation of the same film 4.

In the embodiment shown in the FIG. 1, the cutting surfaces comprise a plurality of cusps 6, projecting from the upper surface 7 of the wall 2, directed toward the film 4. As shown in detail in the FIGS. 2A-2C, the film 4 extends over the cusps 6, at a small distance from them, in such a way that a slight bending of the same film 4 in the direction of the arrow D leads the film 4 into contact with the cusps 6, causing the perforation of the film.

The number and the arrangement of the cusps 6 may vary depending on the needs. In the case shown in the FIGS. 1-2C, the cusps 6 are eighteen, arranged in two concentric circular series (FIG. 2A). However, the cusps 6 may be a different number and may provide different arrangements, star like, triangle like, asterisk like, etc.

The capsule C provides that the pressurized water flow, impinging the film 4, causes its bending in the direction of the arrow D (FIG. 2), so to bring the film 4 into contact with the perforation element 6 which tears the film. In particular, the distance between the film 4 and the cutting surfaces of the cusps, or of other means for perforating or tearing, must be smaller than the deflection displacement of the deformed film in all the provided working conditions. In other words, when the film is subject to the pressure of the water supplied by the pump of the dispensing machine, in normal working conditions of the same, it is deformed of an amount sufficient to bring it into contact with the aforesaid cutting surfaces.

In other words, the invention provides that the capsule C is used in a beverage dispensing machine and that the water supplied by the machine to the capsule C breaks the film 4. In this way the entirety of the contents 3 of the capsule C is guaranteed until the time of its effective usage.

The holes 5 are distributed in a known way on the surface 7 of the wall 2 so to facilitate both the water flowing to the inside of the capsule C and the preparation of the product. As it will be clear from the following, in the case of ground coffee (FIGS. 1-2C) the holes are distributed in a way to guarantee a uniform contact coffee-water, while in the case of soluble coffee the preferential arrangement provides two holes.

Furthermore, the arrangement of the holes 5 in the wall 2 should optimize the turbulent flow of the water flowing inside the capsule C. It is desirable for the water entering the capsule C to reach the entire product 3 before flowing to the outside leaving the capsule C. The holes 5 are arranged according to the shown configuration which exactly optimizes the water flow into the capsule C. Preferably the holes 5 are slanting with respect to the direction D (feature not shown) in order to direct the water—entering the capsule C—according to a direction as much as possible horizontal (i.e. oblique with respect to the direction D). In other words it is desired for the water to enter the container 1 generating a vortex.

Preferably, the cusps 6 are located close to the holes 5 for the passage of the water. In this way the film 4, once lacerated, is prevented from adhering the upper wall 4 in correspondence of one of the holes 5 thus blocking or reducing in the water flow through the same. In the embodiment of FIGS. 1-2C, the holes 5 are alternate with respect to the cusps 6 in the two concentric series. Preferably, the distance between the centre of a hole 5 and the base of a cusp 6 is less than 10 mm, more preferably such distance is included in the range 0.01 mm-3 mm.

Preferably, the cusps 6 according to the shown embodiment have a star-like shaped cross section, with a triangular shaped contour in vertical section. This shape has proved particularly effective since the film 4, perforated by the cusps 6 with circular holes, does not adhere to the external surface of the cusp 6, and passages remain between the film 4 and the cusps 6, sufficient to allow the water flow to penetrate under the film 4. The cusps 6 may be obtained with other shapes, different from the shown one. For instance, the cusps 6 may have a jigsaw tooth shape, and thus may tilt with respect to direction D, with a pyramidal shape, etc.

In this way the film 4, when perforated by a cusp 6, is prevented from fitting or adhering on the same cusp 6, which would prevent the water flow from reaching the gap between film 4 and upper surface 7 of the wall 2 and entering only the capsule the capsule C. The shape of the cusps 6, as above exemplified, must permit the passage of the water at least in the direction of the closest hole 5. In other words, once the film 4 has been perforated by a cusp 6 because of the water flow impinging the same film 4, the water should pass in the opening provided on the film 4 and, flowing on the cusp 6, direct toward a hole 5.

The film 4 can be a traditional type one, for example a film utilized in the food field for sealing packages. Clearly, film 4 must have good mechanical characteristics in order to resist to undesired ruptures, but at the same time it must be sufficiently flexible in order to be deformed by a fluid flow which impinges on it. Moreover, the film has to be rapidly and easily perforable when contact with the cusps 6 starts. In the shown embodiment the film 4 is of a multilayer type, made of a plurality of coupled films, among which an aluminum film and one or more plastic films may be provided, possibly reporting the manufacturer's data and/or the data concerning the product 3.

Figure 4A:
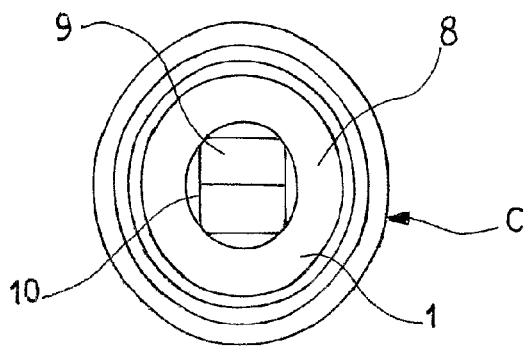
FIGS. 4A-4C are three views, respectively a side view, a top view and a bottom view, of the capsule of FIG. 1 in its assembled state.
Figure 4B:
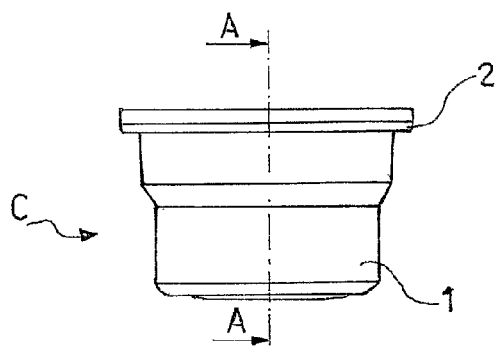
Figure 4C:
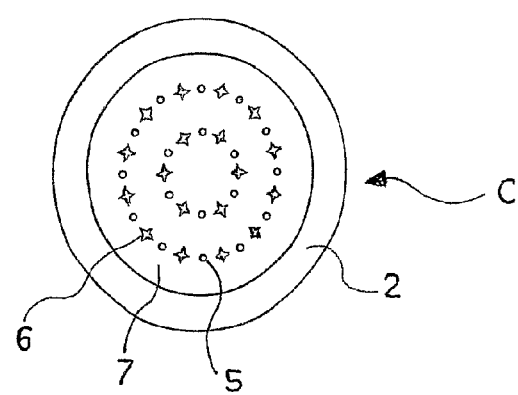

FIG. 4 shows a capsule C assembled and ready to be used in beverage dispensing machine. As previously described, once the capsule C has been loaded in the machine, the opening of the capsule C in correspondence of its upper portion is operated by the water flow supplied by the machine on the film 4. The water flows between the film 4 and the surface 7 and through holes 5 into capsule C, where the coffee powder is. The opening of the lower portion 8 is achieved through the rupture of the frangible mobile element or trap 9 operated by a piercing element (or collector) of the same machine or by the increasing of the internal pressure in the capsule C due to the water entering the same.

Figure 10:
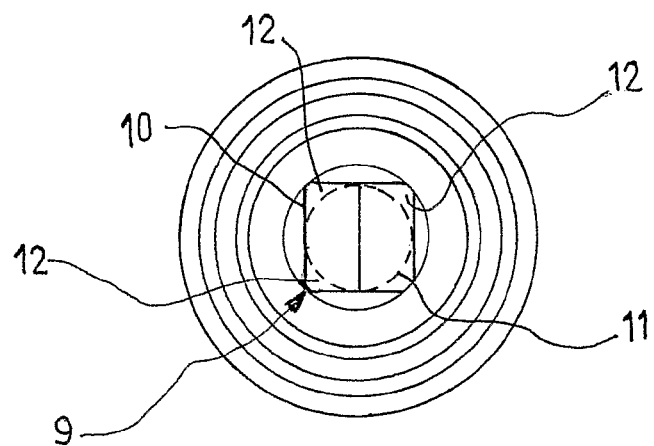
FIG. 10 is a schematic view of a configuration of the breaking lines of the bottom wall of the capsule of FIG. 1.

Preferably, the trap 9 has the square shape shown in the FIGS. 1 and 4. This means that the shape delineated by the breaking lines 10—which define the trap 9—is generally square or "window" like (with two wings), that is the trap may be torn in two halves which open as a wing. In this case the portion of the piercing element intended to break the trap 9 preferably has a circular section, as schematically shown in FIG. 10, with a diameter having length lower than, or equal to, the side 10 of the trap 9. During the perforation of the trap 9, this configuration provides gaps 12 which permit the coffee to flow outside from the capsule C.

The FIGS. 3A-3C show the upper wall 20 of a capsule C according to the present invention, designed for soluble beverages. As known, capsules used for the preparation of soluble beverages (chocolate, tea, white coffee, etc.) contain a greater amount of product 3 than the correspondent capsules for the coffee (for example up to 20 grams of soluble powder versus about 8 grams of ground coffee). In order to obtain an optimal solubilization, even if the upper wall 20 is sealed by way of the film 4 which—as in the case of the FIGS. 1-2C— adheres to the edges 21, the number and the arrangement of the holes 25 and cusps 26 are different with respect to the correspondent holes 5 and cusps 6 of the wall 2. The position of the holes 25 on the wall 20 is as much as possible peripheral in order to supply the water to the encapsulated product 3 in its entirety. Two cusps 26 are provided in correspondence of the holes 25 for perforating the film 4.

Figure 7:
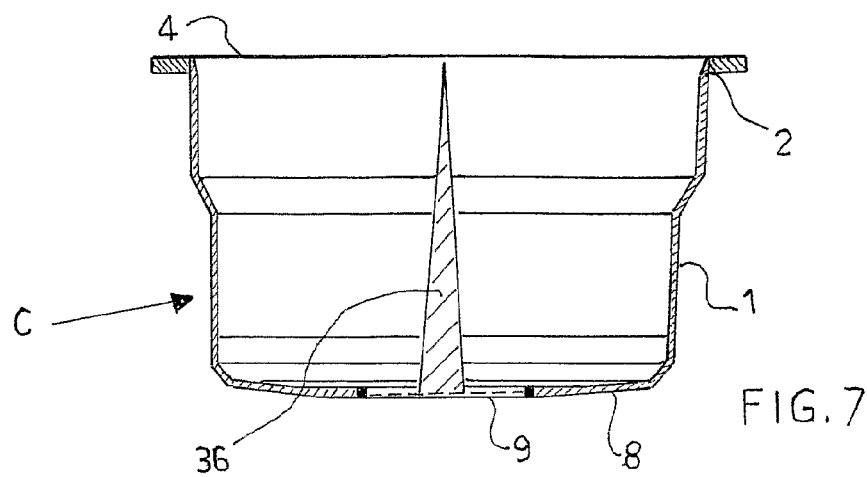
FIG. 7 is a section view of another capsule according to the invention for the preparation of soluble beverages.
Figure 8:
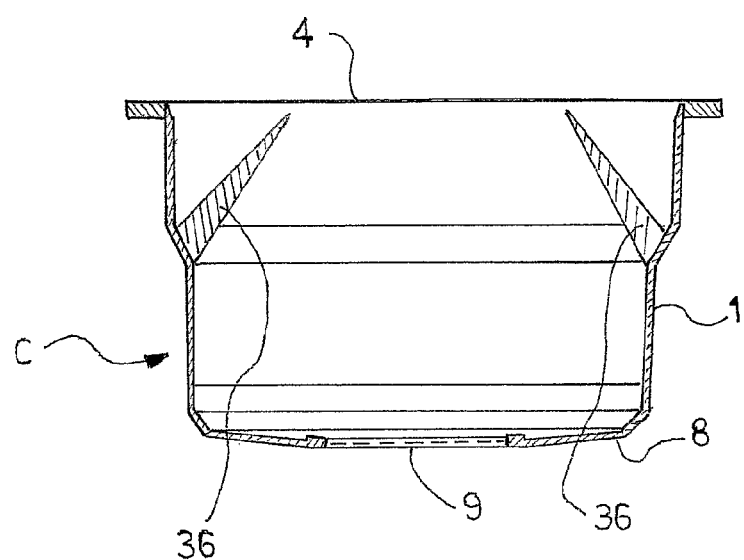
FIG. 8 is a section view of the capsule of FIG. 3A.
Figure 9:
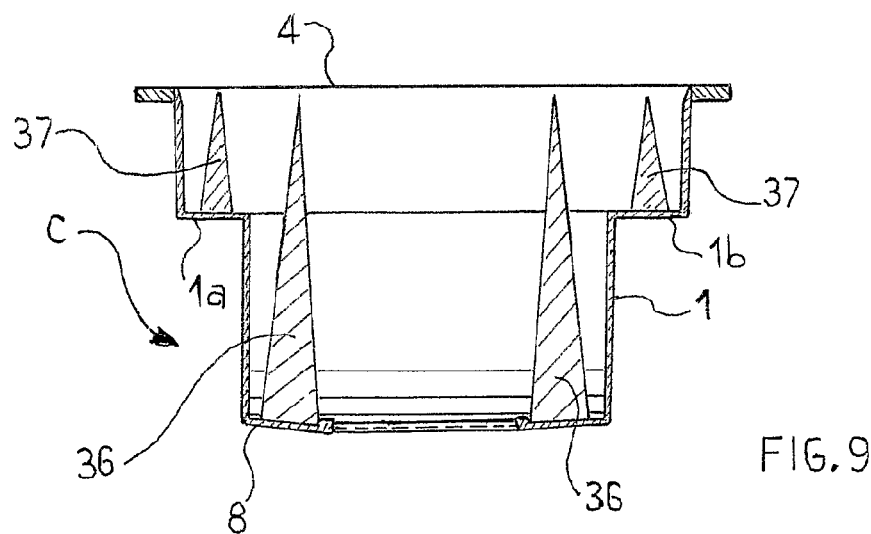
FIG. 9 is a section view of an alternative embodiment of the capsule of FIG. 7.

FIGS. 7-9 show further embodiments of the capsule C. In the above discussed cases, the cusps 6, 26 are integral to the upper wall 2, 20 of the capsule C under the film 4. Instead, capsules C of FIGS. 7-9 are provided with cusps 36, 37 internally to each capsule.

In the capsule C of FIG. 7 a cusp 36 is fixed to the dispensing trap 9 and is mobile with the same. In the FIGS. 8 and 9 the cusps extend from the walls of the capsule.

The capsules C shown in the FIGS. 7-9 locking the upper wall 2, which functions are performed by the film 4. The cusps 36 may be integral with the bottom 8 of the container 1 or even better with the internal walls of the same (as shown in the FIG. 8). Alternatively, as shown in the FIG. 9, the cusps 37 may be fixed to the internal surfaces a, 1b of the capsule C, which are intermediate with respect to the bottom 8 and the upper wall 2. The ends of the cusps 36 and 37 are closed to film 4, at a distance suitable for operating the perforation of the deformed film 4. What is important is that the cusps 36 or 37 perforate the film 4 when this contacts the same cusps. In the case shown in FIG. 7, perforation of the film 4 occurs when the cusp 36—pushed upwardly together the trap by the piercing element (see FIG. 3)—perforates the film 4.

The film 4, as shown, seals the entire extension of the upper surface 7, 27 of the wall 2, 20. Capsule C may also provide a wall 2, 20 having a different shape from the shown one, wherein the film 4 covers only a part of the surface 7, 27 or separate portions of the same.

Figure 5:
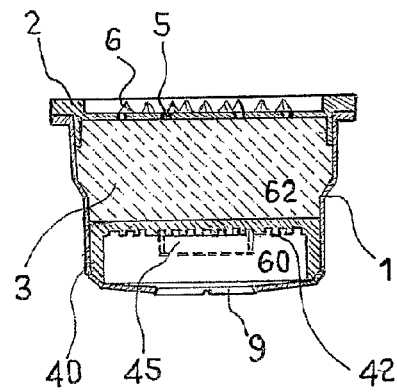
FIG. 5 is a A-A section view of the capsule of FIG. 4.
Figure 6:
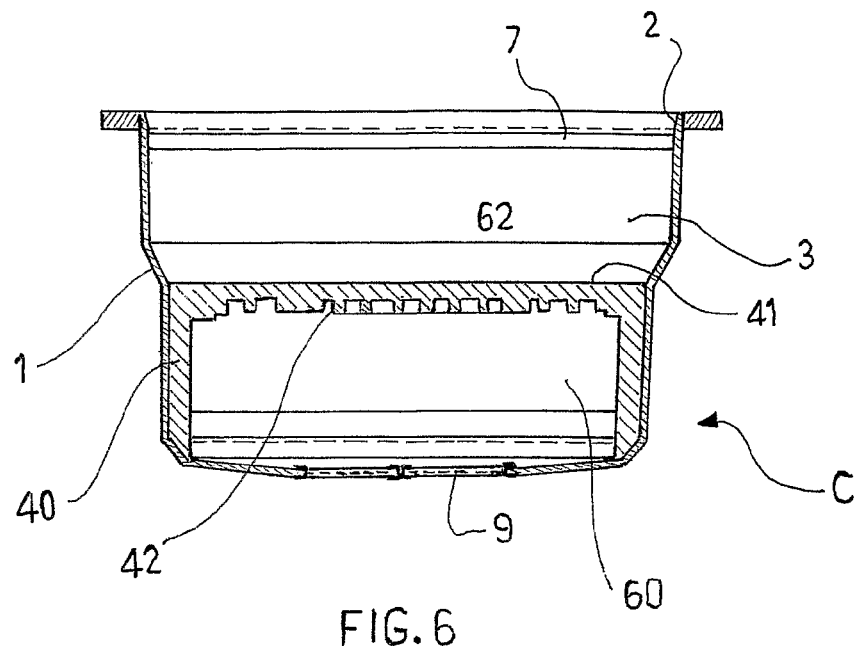
FIG. 6 is a section view of a capsule according to the invention.

FIGS. 5-6D show a capsule C provided with a partition element having the function of dividing, or partitioning, its internal volume. The partition element may have different shapes and dimensions depending on the specific uses which the capsule C is intended to.

In FIG. 6, the partition element is constituted by a spacer 40 having a predefined height extension, in such a way that once inserted in the container 1, the internal volume of the container left available to the product 3 is reduced to the room 62 included between the upper surface 41 of the spacer 40 and the upper surface 7 of the capsule C.

With evident economic advantages, the spacer 40 allows the capsule C to be used both for the preparation of the coffee and for the preparation of soluble beverages. In the first case (coffee), the capsule C is coupled to the spacer 40, in the second case the capsule C has no spacer 40 and the internal volume of the container 1 may be completely filled with the product 3.

Thus, spacer 40 may be inserted in the container 1 at the time of the filling of the capsule C with the product 3. If the amount of product 3 is for example not greater than 10 grams, the spacer 40 is inserted in the container 1 and works as a double bottom for the capsule C. If the product is soluble, the container 1 does not contain the spacer.

In this way it is possible to standardize the external dimensions of the capsule C, and vary the internal ones depending on the needs. It has to be noticed that the element for dividing the volume of the capsule may be provided also in the traditional capsules, i.e. independently by the provided means for the opening of the capsule.

Advantageously, the spacer 40 permits to encapsulate the product 3 according to the most opportune load and/or the compactness grade. In fact the reduction of the convenient volume of the capsule C may be designed to obtain the desired compactness grade for the product 3 in the capsule C.

The FIGS. 1 and 5 show a capsule C provided with a spacer 40 and with opening means of the above mentioned type. A paper filter, or another approved material for foodstuff, is interposed between the spacer 40 and the product 3, in order to stop any powder 3 which has not solubilized during the preparation of the related beverage. Another filter may be interposed between the product 3 and the upper wall of the capsule C.

In order to facilitate dispensing of the beverage prepared with the product 3, the spacer 40 is provided with a set of holes 42 in correspondence of the wall 41.

Figure 6A:
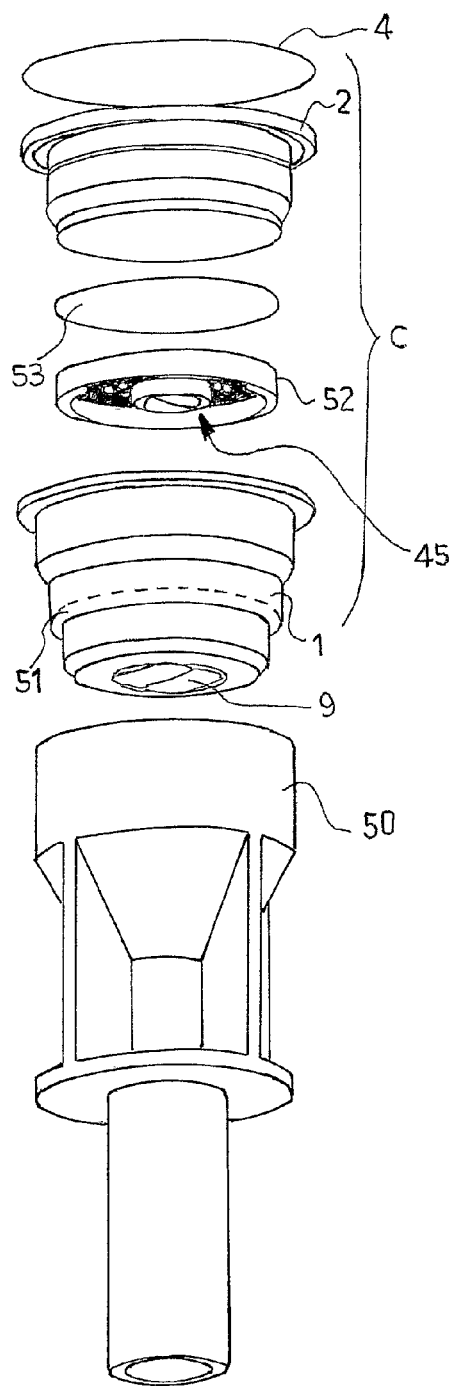
FIG. 6A is an exploded view of another capsule according to the invention.
Figure 6B:
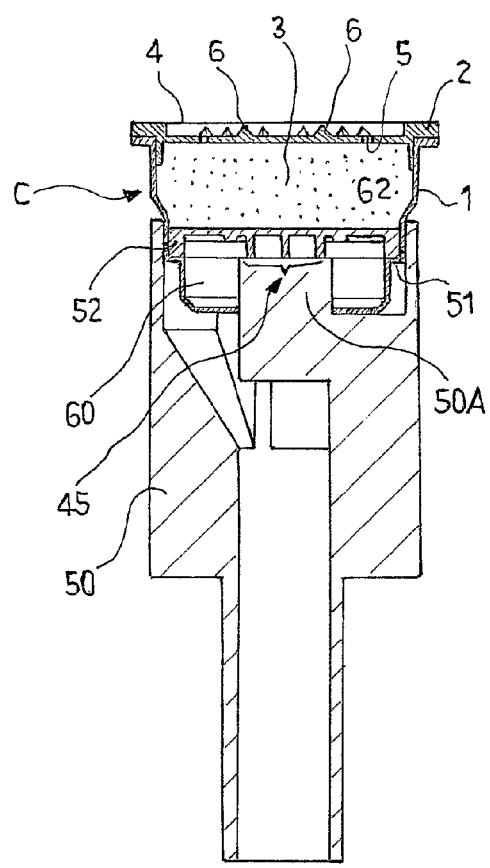
FIG. 6B is a cross section view of the capsule of FIG. 6A.

The FIG. 6A shows a capsule C according to the invention and a piercing-collector element 50 having the function to perforate the trap 9 and direct the beverage dispensed by the capsule C. With respect to the embodiment shown in the FIG. 6, the capsule C of FIG. 6A is provided with a container 1 having a narrowing 51 which forms a step suitable to support an element for dividing the capsule volume which is constituted by a disc 52. Practically, the narrowing 51 is a base internal to the container 1 on which the disc or septum 52 lays. This last has a height lower than the one of the spacer 40 and is not provided with leg portions which abut the bottom of container 1 (FIG. 6B). As one can see in FIG. 6B, during the usage of the capsule C, the piercer-collector 50 partially houses the same capsule and helps to avoid its deformation. A filter 53 is provided between the disc or septum 52 and the food product 3.

The FIGS. 6C and 6D show a further embodiment according to the invention. The element for the partitioning of the serviceable volume of the capsule C in this case is a disk 54 which abuts the base 51. It is important to notice that the distance between the base 51 and the bottom of the capsule is constant for the different embodiments of the FIGS. 6A and 6C, while the height of the element 52, 54 for the reduction of the volume varies. The reduction of the volume for housing product 3 is thus adjusted by varying the height of the used element 40, 52 or 54, while the travel range of the piercing element within the capsule C is constant.

Summarizing, the element for partitioning/reducing the volume of the capsule may have the shape of the spacer 40 which—as shown has a cylindrical shape, is substantially hollow and abuts the bottom of the capsule. Alternatively, such partitioning element may have the shape of a disk or a septum (52 or 54) and may stand on a base 51 provided on the capsule wall. However, other shapes are possible. It is sufficient that the partition element 40, 52 or 54 is fixed to container 1, for example by way of a fit coupling or welding, and allows the passage of the beverage toward the trap 9. In order to avoid possible interferences between the trap and the partition element, the capsule is preferably provided with the trap 9, having two halves which open by departing one from the other. In fact the "double wing" like opening of the trap 9 minimizes the risks that interferences generate between the two halves of the trap 9 (the wings) pushed by the piercing element inside the capsule C and the element 40, 52, 54 provided within the capsule C. In fact a single wing trap 9, once it has been opened, may contact the lower wall of the spacer or disk, thus interfering with the proper beverage dispensing, for example preventing part of the foam formed by the infusion of the product 3 inside the capsule to exit.

As above mentioned, the trap 9 has a square or quadrilateral shape in combination with a circular shape of the section of the piercing element 50A, in order to obtain a plurality of gaps for the beverage exit in correspondence of the trap vertices. In this way the presence of foam is increased in the dispensed product.

Alternatively to trap 9, the capsule C according to the present invention may be provided with an opening sealed by a film which is perforable by the piercing element. For example an opening, having equal dimensions of the trap 9, is provided on the bottom of the container 1 and sealed is a film perforable by the piercer-collector 50 or by an equivalent element. This solution, in fact, prevents an interference from generating between parts of the capsule C and the lower wall of the element 40, 52 or 54 for the volume reduction.

The spacer 40 is preferably provided with a supporting surface 45 suitable to contact the piercing element 50A. The supporting surface, for example a rise or a shim, permits the piercing element 50A to abut the spacer, and to support the same during the beverage dispensing and avoiding harmful "swellings", i.e. deformations toward the capsule C bottom due to the force exerted by the internal pressure during the dispensing of the beverage. In other words, the support provided by the piercing element 50A of the collector 50 improves the resistance of the capsule C to the deformations caused by the increase of the internal pressure, which deformations may cause the passage of powder around the capsule filter. Because of the length of the piercing element 50A being constant, the thickness of the supporting surface 45 may be greater or smaller depending on the distance between the disk 52 or 54 and the capsule bottom, in such a way that the surface 45 is always substantially abutting the piercing element 50A: for example, in the FIGS. 6A and 6B the thickness of the supporting surface 45 is greater than the one of the embodiment of FIGS. 6C and 6D because the volume defined upwardly from the partition element is lower than the one of FIGS. 6C and 6D.

With reference to FIGS. 5, 6B and 6D, a volume 60 is provided between the lower wall of each element 40, 52 or 54 and the bottom 8 of the container 1. Also the volume 60 may be used for housing food product, for example a second product which, together the product 3, is used to prepare the beverage. For example, the volume 60 may be completely or partially filled with powder milk, or with liquid milk, powder cocoa, etc. The elements 40, 52 or 54 for dividing/reducing the volume of the capsule C may thus be designed also for maximizing or minimizing the volume 60. For example, when minimization of the volume 60 is desired, the element 54 of FIG. 6D may be provided with a lower portion 61 having a toroidal shape.

The capsules according to the present invention may be made of known common plastic materials used in this field, for example polyolefins (e.g. polypropylene and polyethylene and/or copolymers thereof, or multi-layer polyolefin and aluminium suitable for use in the food field, according to the needs of each particular application.

The invention claimed is:

1. A disposable capsule for preparing a beverage from a food product housed therein, comprising:
    a plurality of walls,
    means for dispensing said beverage,
    means for supplying a fluid inside the capsule,
    a film for isolating said supplying means from an external environment to the capsule that is provided on an upper part of the capsule, the film being a first wall among the plurality of walls; and
    means for perforating said film, wherein said means for perforating said film are fixed with respect to the capsule and are positioned on a second wall among the plurality of walls of the capsule between said second wall and the film to perforate the film when the film is pressed down by incoming water, and at least a portion of the film is movable between a rest position in which the film isolates said supplying means and a position where said perforating means engage and perforate the film so that said supplying means supplies the fluid inside the capsule and said dispensing means dispenses said beverage.

2. The disposable capsule according to claim 1, wherein said film is deformable and said film perforates by said perforating means when deformed under a pressure exerted by pressurized hot water directed to said capsule and to said film to prepare said beverage.

3. The disposable capsule according to claim 1, wherein said film is secured to a deformable portion of the capsule that is on a lateral wall among the plurality of walls of the capsule.

4. The disposable capsule according to claim 1, wherein said means for perforating said film are inside the capsule.

5. The disposable capsule according to claim 1, wherein said means for perforating said film comprise one or more cutting projections, arranged on the second wall of the capsule, which underlies the film.

6. The disposable capsule according to claim 5, wherein said cutting projections are arranged in correspondence with through holes provided in said second wall of the capsule, which underlies the film.

7. The disposable capsule according to claim 6, wherein said through holes are oblique with respect to the vertical axis of the capsule.

8. The disposable capsule according to claim 5, wherein at least a part of an upper wall of said capsule includes said film and said projections are fixed to one or more internal walls of said capsule.

9. The disposable capsule according to claim 1, wherein said film is a multi-layer film comprising films including a plastic material, aluminium, and labels.

10. The disposable capsule according to claim 1, wherein said means for dispensing said beverage include on a bottom wall among the plurality of walls of the capsule one of a trap having a substantially square shape and being pierceable by a piercing element, external to the capsule, that has a substantially circular section a diameter of which is lower than, or equal to, the side of said trap, and an opening closed by a frangible film.

11. A disposable capsule according to claim 1, further comprising an element for partitioning the internal volume of the capsule.

12. A method for opening a capsule for the preparation of a beverage from a food product housed therein, the method comprising:
    providing said capsule including a plurality of walls,
    providing means for dispensing said beverage,
    providing means for feeding a fluid to the capsule,
    providing a film for isolating said feeding means from an external environment to the capsule, the film being a first wall among the plurality of walls, and with means positioned on a second wall among the plurality of walls of the capsule between the second wall and the film for perforating said film, and
    bringing said film in contact with at least a part of said perforation means to perforate the film when the film is pressed down by incoming water so that said feeding means feeds the fluid to the capsule and said dispensing means dispenses said beverage.

13. A method according to claim 12, further comprising applying a pressure to at least a portion of said film in order to deform the film and bring the film into contact with said means for perforating said film.

14. A method according to claim 12, wherein said bringing said film in contact with at least a part of said perforation means includes said perforation means perforating the film when the film deforms under a pressure exerted by pressurized hot water directed to said capsule and to said film to prepare said beverage.

15. A method according to claim 14, wherein said incoming water flows through two or more internal volumes of said capsule, each volume containing at least a product.

16. The disposable capsule according to claim 2, wherein said film is secured to a deformable portion of the capsule that is on a lateral wall among the plurality of walls of the capsule.

17. A disposable capsule for preparing a beverage from a food product housed therein, comprising:
    a plurality of walls,
    an opening that dispenses said beverage,
    at least one orifice that supplies a fluid inside the capsule,
    a film that isolates the at least one orifice from an external environment to the capsule, the film being a first wall among the plurality of walls; and
    protrusions that penetrate said film, said protrusions being fixed with respect to the capsule and positioned on a second wall among the plurality of walls of the capsule between said second wall and the film to perforate the film when the film is pressed down by incoming water so that the at least one orifice supplies the fluid inside the capsule and the opening dispenses said beverage, at least a portion of the film being movable between a rest position and a position where the film engages said protrusions.

18. The disposable capsule according to claim 1, wherein said second wall is an upper wall among the plurality of walls of the capsule.

19. The disposable capsule according to claim 1, wherein said second wall is at least one of a lateral wall and a bottom wall among the plurality of walls of the capsule.

* * * * *